United States Patent [19]
Ahn

[11] Patent Number: 5,886,848
[45] Date of Patent: Mar. 23, 1999

[54] CASSETTE LOADING DEVICE FOR USE IN A VIDEO CASSETTE RECORDER

[75] Inventor: Seong-Ick Ahn, Seoul, Rep. of Korea

[73] Assignee: Daewoo Electronics Co., Ltd., Seoul, Rep. of Korea

[21] Appl. No.: 566,629

[22] Filed: Dec. 4, 1995

Related U.S. Application Data

[63] Continuation-in-part of Ser. No. 306,904, Sep. 15, 1994, abandoned.

[30] Foreign Application Priority Data

Sep. 16, 1993 [KR] Rep. of Korea .................. 1993-18577

[51] Int. Cl.$^6$ .............................. G11B 5/008; G11B 33/00
[52] U.S. Cl. .............................................. 360/96.5; 360/95
[58] Field of Search ................................ 360/96.5, 95, 85

[56] References Cited

U.S. PATENT DOCUMENTS

| 4,628,382 | 12/1986 | Okumura | ................................... 360/93 |
| 4,831,472 | 5/1989 | Ando et al. | ............................. 360/96.5 |
| 4,864,439 | 9/1989 | Duurland | ............................... 360/96.5 |
| 4,992,895 | 2/1991 | Kim | ....................................... 390/96.5 |
| 5,050,022 | 9/1991 | Aizawa | ................................... 360/96.5 |
| 5,164,871 | 11/1992 | Hughes et al. | .......................... 360/133 |
| 5,430,587 | 7/1995 | Engan | ..................................... 360/96.5 |

*Primary Examiner*—William J. Klimowicz
*Attorney, Agent, or Firm*—Anderson, Kill & Olick, P.C.

[57] ABSTRACT

A cassette loading device for use in a video cassette recorder includes a pair of side walls, a rotating arm shaft, a cassette holder, and a pair of loading arms. Each of the loading arms is provided with a lengthwise open slot for retaining a slide pin of the cassette holder, first and second legs. The first leg has an urging portion and an elongated hole for providing the urging portion with resiliency, the urging portion being integrally molded with the first leg.

2 Claims, 3 Drawing Sheets

CASSETTE LOADING DEVICE FOR USE IN A VIDEO CASSETTE RECORDER

CROSS REFERENCE TO RELATED APPLICATION

This application is a continuation-in-part of application Ser. No. 08/306,904, filed on Sep. 15, 1994, now abandoned.

FIELD OF THE INVENTION

The present invention relates to a cassette loading device for use in a video cassette recorder ("VCR"); and, more particularly, to an improved loading arm incorporated therein with a simpler configuration.

DESCRIPTION OF THE PRIOR ART

A rotating loading arm-type prior art cassette loading device used in a VCR is shown in FIGS. 1 and 2. This type of cassette loading device normally comprises a pair of side walls 2 (only one shown), each of which has a guide slot 3, a rotating arm shaft 4, a cassette holder 5 having a pair of slide pins 6 (only one shown), each slide pin 6 moving along the guide slot 3 and a pair of pivotable loading arms 10 (only one shown) for pressing the slide pins of the cassette holder 5, respectively, as shown in FIG. 1.

Each of the loading arms 10 is secured to both ends of the rotating arm shaft 4 and is provided with a longitudinal slot 11 for retaining the slide pin 6 and a torsion spring 20 which resiliently presses the slide pin 6, to thereby move the cassette holder 5 together with a tape cassette (not shown) therein toward an operative position of the tape cassette and then bias the cassette holder 5 against a deck 1. As further shown in FIG. 2, the loading arm 10 also has a plurality of structures such as a groove 12, a boss 13, a protrusion 14 and an elongated slot 15, in order to hold the torsion spring 20.

Therefore, in such a prior art cassette loading device, the shape of the loading arm is rather complicated and the production cost thereof is relatively high.

SUMMARY OF THE INVENTION

It is, therefore, a primary object of the present invention to provide a cassette loading device incorporating therein a loading arm with a simpler configuration.

In accordance with one aspect of the present invention, there is provided a cassette loading device for use in a video cassette recorder including a pair of side walls each of which has a guide slot, a rotating arm shaft having two ends, a cassette holder having a pair of slide pins moving along the guide slots, and a pair of loading arms fixedly secured to the ends of the rotating arm shaft, respectively, characterized in that: each of the loading arms is provided with a lengthwise open slot for retaining the slide pin of the cassette holder, first and second legs, the first leg having an urging portion and an elongated hole for providing the urging portion with a resilience, the urging portion being integrally molded with the first leg.

BRIEF DESCRIPTION OF THE DRAWINGS

The above and other objects and features of the instant invention will become apparent from the following description of preferred embodiments, taken in conjunction with the accompanying drawings, in which.

DETAILED DESCRIPTION OF THE PREFERRED EMBODIMENTS

Figure 1:
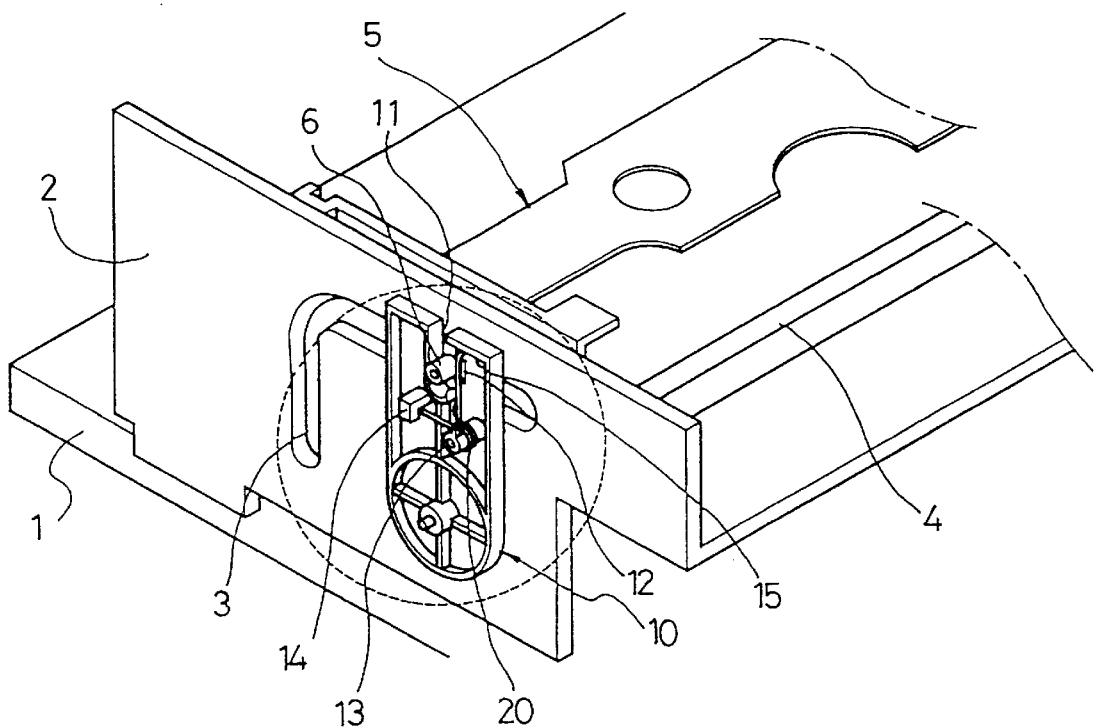
FIG. 1 shows a partial perspective view of the prior art cassette loading device.
Figure 2:
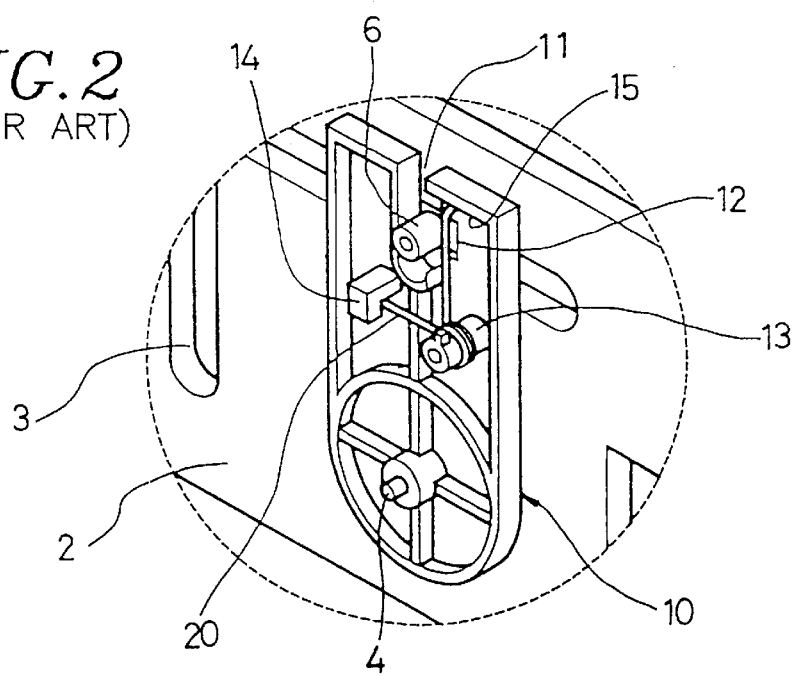
FIG. 2 represents an enlarged view of the loading arm shown in FIG. 1.
Figure 3:
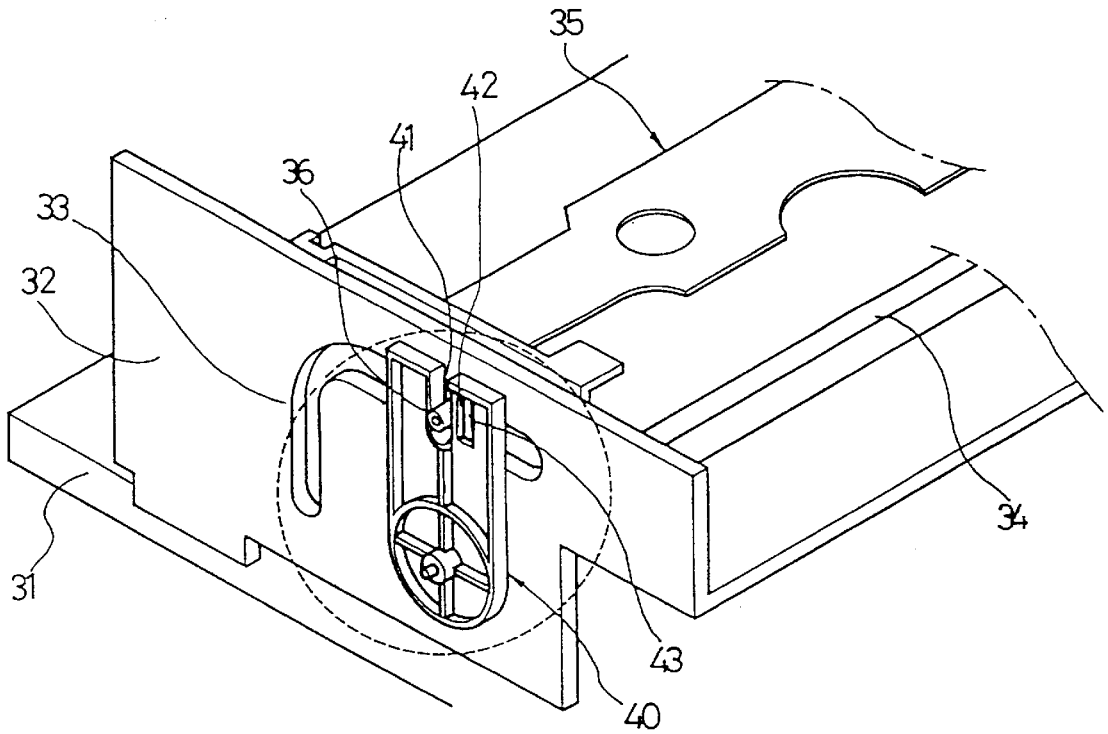
FIG. 3 illustrates a partial perspective view of the inventive cassette loading device, mainly showing a loading arm thereof.

Referring to FIG. 3, there is partially shown a cassette loading device of the present invention. The cassette loading device comprises a pair of loading arms 40 (only one shown), a rotating arm shaft 34, a pair of side walls 32 (only one shown), and a cassette holder 35.

The pair of side walls 32 is mounted on both lateral end portions of a deck 31, respectively. Each of the side walls 32 has a generally "L" shaped guide slot 33.

The cassette holder 35 is provided with a pair of slide pins 36 each of which is adapted to move along the guide slot 33 of the side wall 32. The cassette holder 35 receives a loaded tape cassette (not shown) and carries it to its operation position.

The pair of loading arms 40 is fixedly secured to both ends of the rotating arm shaft 34, each of which extends through a hole (not shown) on each side wall 32, respectively.

Figure 4:
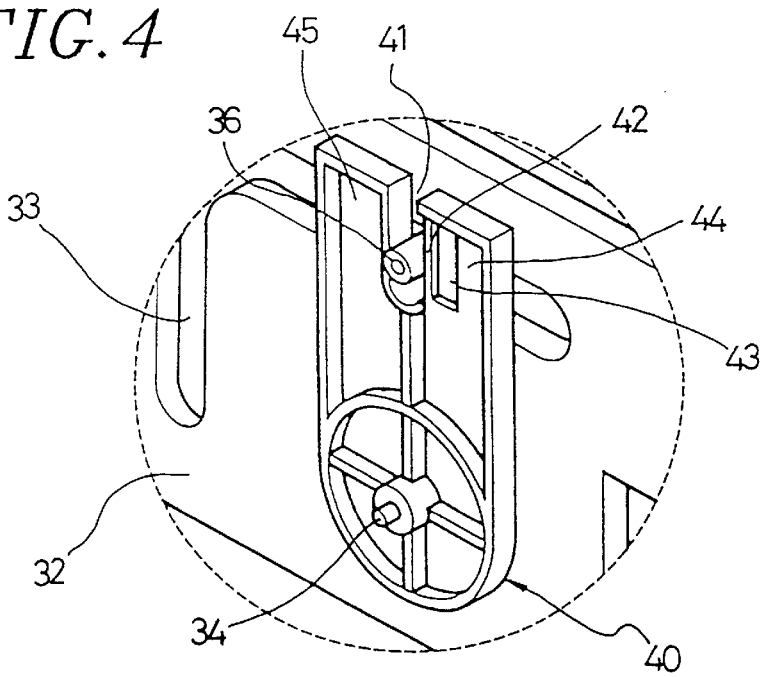
FIG. 4 offers an enlarged perspective view of the loading arm shown in FIG. 3.

As shown in detail in FIG. 4, each of the loading arms 40 has a lengthwise open slot 41 for retaining the slide pin 36 of the cassette holder 35 therein, and first and second legs 44 and 45.

The first leg 44 has an urging portion 42 and an elongated hole 43 for providing the urging portion 42 with resilience, to thereby allow the urging portion 42 to resiliently press the slide pin 36. The urging portion 42 is integrally molded with the first leg 44 and connected thereto at both ends.

Figure 5:
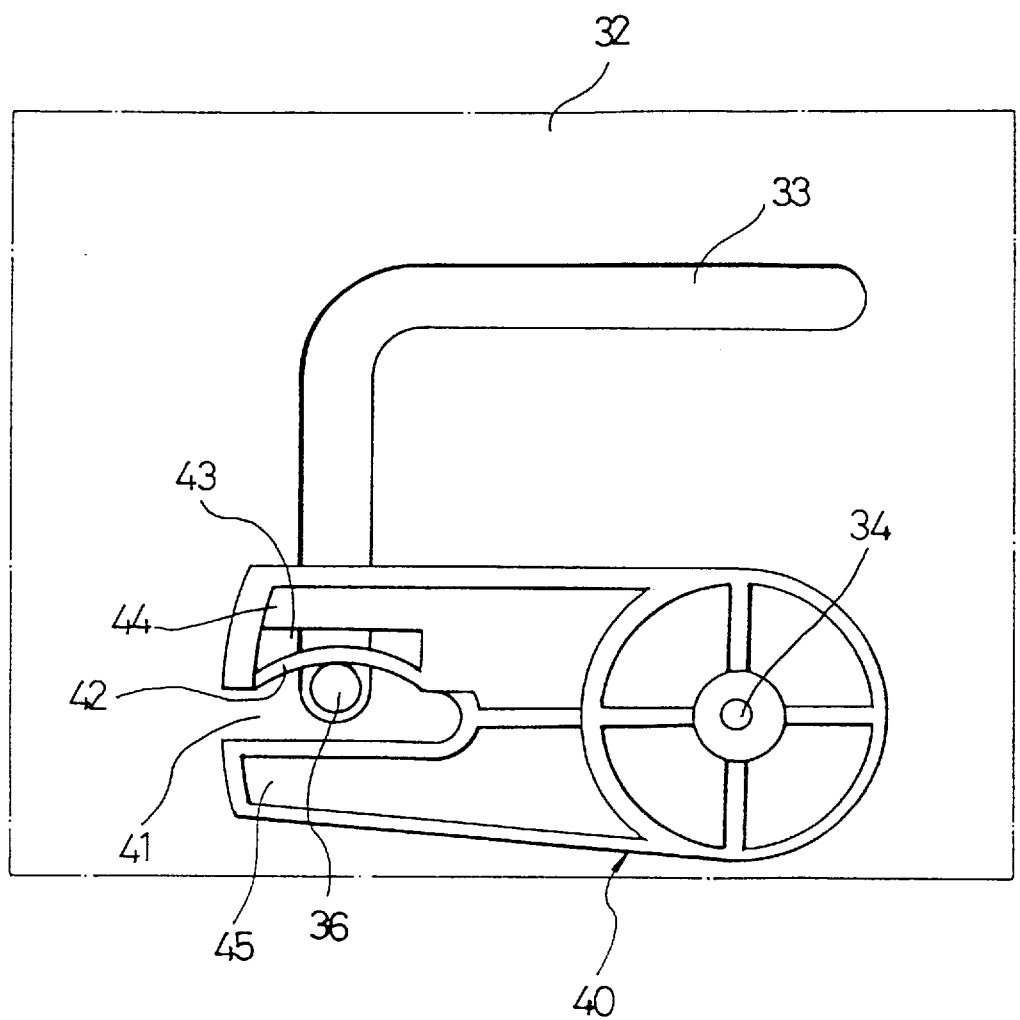
FIG. 5 presents a schematic side view of the cassette loading device of FIG. 3.

When a tape cassette has been loaded into the cassette holder 35, if desired, the urging portions 42 of the loading arms 40 press the slide pins 36 of the cassette holder 35, respectively, so that the cassette holder 35 is further moved to the tape cassette operation position and the urging portions 42 then bias the cassette holder 35 against the deck 31, as shown in FIG. 5.

It is required that the urging portions 42 tolerate a maximum deformation (about 2 mm) without breakage.

On the other hand, the second legs 45 press the slide pins 36 of the cassette holder 35 while the tape cassette is unloaded.

Such a cassette loading device of the present invention decreases the production cost thereof, since the loading arm 40 incorporated therein has a configuration simpler than that of the prior art loading arm.

Although the invention has been shown and described with respect to the preferred embodiments, it will be understood by those skilled in the art that various changes and modifications may be made without departing from the spirit and scope of the invention as defined in the following claims.

What is claimed is:

1. A cassette loading device for use in a video cassette recorder including a pair of side walls each of which has a guide slot, a rotating arm shaft having two ends, a cassette holder having a pair of slide pins moving along the guide slots, and a pair of loading arms fixedly secured to the ends of the rotating arm shaft, respectively, characterized in that:

each of the loading arms is provided with a lengthwise open slot for retaining one of the slide pins of the cassette holder, and first and second legs, the first leg having an urging portion and an elongated hole for providing the urging portion with resilience, the urging portion being integrally molded with the first leg and connected thereto at both ends, thereby completely separating the elongated hole from the lengthwise open slot the urging portion contacting and moving the slide pin of the cassette holder to a tape cassette operation position and resiliently pressing the slide pin.

2. A video cassette recorder incorporating therein a cassette loading device as recited in claim 1.

* * * * *